United States Patent
Bengtsson

(10) Patent No.: US 9,945,303 B2
(45) Date of Patent: Apr. 17, 2018

(54) SYSTEM AND METHOD FOR CONTROLLING THE PERFORMANCE OF AN ENGINE

(71) Applicant: SEM AB, Amal (SE)

(72) Inventor: Jorgen Bengtsson, Svanskog (SE)

(73) Assignee: SEM AB, Amal (SE)

( * ) Notice: Subject to any disclaimer, the term of this patent is extended or adjusted under 35 U.S.C. 154(b) by 0 days.

(21) Appl. No.: 14/889,599

(22) PCT Filed: May 7, 2014

(86) PCT No.: PCT/EP2014/059386
§ 371 (c)(1),
(2) Date: Nov. 6, 2015

(87) PCT Pub. No.: WO2014/180927
PCT Pub. Date: Nov. 13, 2014

(65) Prior Publication Data
US 2016/0084174 A1    Mar. 24, 2016

(30) Foreign Application Priority Data
May 7, 2013    (SE) .................... 1350561-5

(51) Int. Cl.
*F02D 35/02*    (2006.01)
*G01L 23/22*    (2006.01)
(Continued)

(52) U.S. Cl.
CPC .......... *F02D 35/027* (2013.01); *F02D 35/021* (2013.01); *F02D 41/26* (2013.01);
(Continued)

(58) Field of Classification Search
CPC .... F02P 5/152; F02P 5/1525; F02P 2017/125; F02P 2017/128; G01L 23/22–23/227; F02D 35/021; F02D 35/027
(Continued)

(56) References Cited

U.S. PATENT DOCUMENTS

| | | | | |
|---|---|---|---|---|
| 4,823,600 A | * | 4/1989 | Biegel | G01M 3/243 73/40.5 A |
| 5,205,258 A | * | 4/1993 | Hashimoto | F02P 5/152 123/406.35 |

(Continued)

FOREIGN PATENT DOCUMENTS

| | | |
|---|---|---|
| DE | 10313558 A1 | 10/2003 |
| EP | 1130254 A1 | 9/2001 |
| WO | 2011090426 A1 | 7/2011 |

OTHER PUBLICATIONS

International Search Report and Written Opinion for PCT/EP2014/059386 filed May 7, 2014, dated Sep. 1, 2014, 10 pages.
(Continued)

*Primary Examiner* — Erick Solis
*Assistant Examiner* — Robert Werner
(74) *Attorney, Agent, or Firm* — John M. Harrington, Esq.; Johnson, Marcou & Isaacs, LLC

(57) ABSTRACT

The present invention relates to a method for controlling the performance of an engine, comprising the steps detecting an ion current in the form of a first signal analysing said first signal to determine at least one property determining a knock index based on said first signal and preferably on said at least one property combining said knock index with a plurality of factors related to properties of the engine or the operation of the engine to arrive at a engine index, and comparing said engine index with a sensitivity map of the engine to determine a correction required to improve the operation of the engine, and correcting the operation of the
(Continued)

engine in accordance with the correction determined. The invention also relates to a system for controlling the performance of an engine.

18 Claims, 2 Drawing Sheets

(51) Int. Cl.
*F02D 41/26* (2006.01)
*F02P 5/152* (2006.01)
*F02P 17/12* (2006.01)
*F02D 41/00* (2006.01)

(52) U.S. Cl.
CPC ............ *F02P 5/152* (2013.01); *G01L 23/226* (2013.01); *F02D 41/0025* (2013.01); *F02P 2017/125* (2013.01); *F02P 2017/128* (2013.01)

(58) Field of Classification Search
USPC ............ 123/406.16, 406.21, 406.23, 406.24; 73/35.08
See application file for complete search history.

(56) References Cited

U.S. PATENT DOCUMENTS

| | | | | |
|---|---|---|---|---|
| 8,713,992 | B2* | 5/2014 | Bengtsson | ............ F02D 35/021 |
| | | | | 73/35.08 |
| 9,074,538 | B2* | 7/2015 | Itou | ........................ G01L 23/225 |
| 2001/0017051 | A1* | 8/2001 | Asano | ..................... F02P 17/12 |
| | | | | 73/35.08 |
| 2003/0183195 | A1* | 10/2003 | Uchida | ................. F02D 35/027 |
| | | | | 123/406.33 |
| 2004/0074476 | A1* | 4/2004 | Uchida | ................... F02P 5/152 |
| | | | | 123/406.38 |

OTHER PUBLICATIONS

Chinese Office Action for Chinese Patent Application No. 2014800301967, 8 (Applicant not provided with English-language translation of the Office Action).

* cited by examiner

SYSTEM AND METHOD FOR CONTROLLING THE PERFORMANCE OF AN ENGINE

CROSS REFERENCE TO RELATED APPLICATIONS

The present application is a 35 U.S.C. § 371 national stage of International Application No. PCT/EP2014/059386 filed on May 7, 2014, published in English under PCT Article 21(2), which claims the benefit of priority to Swedish Patent Application No. 1350561-5 filed May 7, 2013, the disclosures of which are hereby incorporated in their entirety by reference.

TECHNICAL FIELD

The present invention relates to a method for controlling the performance of an engine, comprising the steps of detecting an ion current in the form of a first signal, analysing said first signal to determine at least one property, determining a knock index based on said first signal and preferably on said at least one property and combining said knock index with at least one multiplier to arrive at an engine index. The invention also relates to a system for controlling the performance of an engine.

BACKGROUND ART

Within the area of engine control systems, it is desirable to avoid the phenomenon known as knock to optimize the performance of the engine and to avoid damages on the engine. In order to control the operation of the engine and avoid knock while at the same time optimize the operation, maps (i.e. tables of data) are commonly used. A map may be a table of values for a particular parameter at different operating conditions of the engine (e.g., a particular speed and load). These parameters are typically predetermined for a specific engine. It is also known to use data regarding the ion current to detect knock or calculate knock index. A generation of a knock event in an engine is a considerable problem, because when an engine knocks it can also cause severe damages on the engine. In an internal combustion engine the air and fuel mixture is introduced into a combustion chamber and then compressed by an ascending movement of a piston, the compressed mixture is fired and combusted by a spark that is generated by applying a high voltage to a spark plug installed in the combustion chamber and the force produced as the piston is pushed down is recovered as work. Occasionally the pressure created by the combustion itself can cause the air and fuel mixture not yet combusted to ignite prematurely, creating a smaller, instantaneous combustion of the end gas that is the cause of the knock event. This condition is not desirable because it can damage or destroy engine parts so it is desirable to prevent the generation of knock event. When combustion is performed in the combustion chamber, molecules of the mixture in the chamber are ionized, so when a measuring voltage is impressed to the spark plug in the combustion chamber, a current, ion current, flows due to the electric charge of the ions. It is known that the ion current changes depending on the combustion pressure and hence, occurrence of a knock (pressure oscillation) can be determined by detecting the signal content of the ion current.

Performance of an engine may be affected by a variety of environmental factors—fuel quality, humidity, air quality, oil quality, air temperature, and the like. An engine should be adaptable to different fuel sources (e.g., different ethanol or methanol concentrations in gasoline, different biodiesel concentrations in diesel, and/or different natural gas components). Additionally, many engines are designed for multi-fuel use (e.g., using diesel and natural gas). Within these categories, fuel quality may vary (e.g. the concentration of sulfur, water, and/or other contaminants). Different fuels may have different energy content. Therefore different fuels may result in significantly different in cylinder pressure for the same amount of combusted fresh air mixed with the fuel to achieve a given (e.g., stoichiometric) combustion.

Engine load is often estimated using an air mass flow sensor. Under the assumption of a known fuel energy content an estimate of the engine load can be computed. Once the engine load has been estimated it is straight forward to compute the corresponding in cylinder pressure. However, if the energy content of the fuel varies, the computed in cylinder pressure may be incorrect. This may degrade the engine performance and/or damage the engine.

There is a need to find a solution to the above mentioned problems to optimize engine work and suppress knocks.

U.S. Pat. No. 6,748,922 B2 discloses a knock control apparatus for internal combustion engines, the knock control apparatus comprises a frequency magnitude calculation part that includes a frequency magnitude detector for detecting the magnitude of a specific frequency based on an output of an ionic current detector, an ionic current area calculator for calculating an ionic current area in a prescribed range during the combustion stroke of a cylinder concerned based on the output of the ionic current detector, a corrector for correcting the detected specific frequency magnitude based on the calculated ionic current area, a knock determiner for determining based on the corrected specific frequency magnitude whether the engine is knocking, and a control parameter correction amount setter for setting an amount of correction for an ignition timing control parameter based on the determination result.

U.S. Pat. No. 6,230,546 discloses a method and an apparatus for detecting knocking combustion in an internal combustion engine, by evaluating the ionic current signal sensed in the combustion chamber, is ostensibly adapted to correct or compensate the ionic current signal for longterm variations arising therein, for example due to variations in the composition of the fuel as a result of contamination with metallic components or the like.

US 20030183195 discloses an ionic current intensity determined by ionic current intensity learning means for determining the ionic current intensity based on an output from an ionic current detection circuit, at least one of a comparison reference value of a comparison reference value setting means and a control parameter correction amount of control parameter correction request amount setting means is corrected, so that, even in a case where fuel is mixed with additives, and a case where a non-standard spark plug is mounted, the ionic current amount fluctuation is accurately determined even if the amplitude of a knock signal varies due to ionic current intensity fluctuation, and correction of the comparison reference value corresponding to the ionic current intensity, or correction of the control parameter, is performed, to thereby prevent erroneous control based on erroneous knock detection, and securely achieve an excellent knock detection status and knock control status.

U.S. patent application Ser. No. 13/517,920 (PCT/SE11/50050) relates to a device for analyzing a cylinder wise performance of an internal combustion engine, comprising ion current measurement means that are arranged to measure an ion current in a engine.

These documents and their respective priority documents are incorporated by reference herein.

DISCLOSURE OF THE INVENTION

An object of the present invention is to eliminate or at least to minimize the problems described above. This is achieved through a method and a system according to the appended independent claims. Accordingly, the operation of the engine can be controlled in a more sensitive and convenient way, allowing for the ignition timing to be adjusted to achieve a more efficient combustion.

A method for controlling the performance of an engine, may comprise a) detecting a first signal representing an ion current from an ion sensor sensing a combustion event in a cylinder of the engine, b) calculating a knock index based on the first signal, c) determining an operating condition of the engine during the combustion event, preferably from at least one of a sensor sensing the operating condition and an map describing the operating condition, preferably from an engine map comprising a speed of the engine and a load on the engine during the combustion event, d) determining an expected knock intensity describing an allowable intensity of a knocking event during the combustion event, e) selecting one or more multipliers based on the operating condition, preferably wherein a multiplier is at least one of:
  a. calculated from data provided by the sensor sensing the operating condition, preferably at least one of the ion sensor, a fuel quality sensor, a temperature sensor, and a contaminant sensor, and
  b. selected from a table comprising the map, preferably an engine map, preferably a map of speed and load,
f) calculating at least one of:
  a. knock proxy based on the knock index and the one or more multipliers, preferably wherein the knock index is multiplied by at least one of the multipliers; and
  b. a knock intensity proxy based on the expected knock intensity and the one or more multipliers, preferably wherein at least one expected knock intensity is divided by at least one of the multipliers,
g) comparing at least one of:
  a. the calculated knock proxy to the expected knock intensity; and
  b. the knock index to the knock intensity proxy, to determine a deviation; and h) correcting the operation of the engine, preferably adjusting at least one of an ignition timing and a fuel injection, when the deviation exceeds a threshold that indicates correction is required.

The method may comprise a. repeating steps a)-f) for at least 2 combustion events, preferably at least 4 combustion events, preferably at least 10 combustion events, preferably at least 50 combustion events, prior to correcting the operation in step g), and b. comparing comprises comparing an average value of at least one of the knock index, the knock proxy and the knock intensity proxy over the repeated combustion events.

By incorporating information from the multipliers into the knock index (to calculate the knock proxy) or the expected knock intensity (to calculate the knock intensity proxy) a more accurate representation of the actual intensity of the measured knocking event may be created. By scaling a measured value according to the operating condition and comparing the scaled value to an expected value (or alternately, scaling the expected value and comparing it to the measured value), deviation (between these values) that is merely associated with variations in operating condition may be reduced. As a result, an actual deviation may be more representative of an actual knocking event (that thus requires correction) than deviation due to differences in operating conditions.

The method may comprise calculating at least one of a peak amplitude of the first signal, and an integral of at least a portion of the first signal, preferably an integral between a first time and a second time. The first signal may be transformed into the frequency domain (e.g., using fourier or laplace transforms), bandpass-filtering the transformed signal (to remove signals outside a band or range) and determining at least one of an amplitude and an integrated area beneath the filtered, transformed signal. A knock index may be calculated from a peak position of a peak in the first signal (and/or transformed first signal).

In some cases, a gain of an amplifier may be controlled in response to an operating condition. A method may comprise comparing the first signal to a saturation limit of the amplifier, and adjusting a gain of the amplifier in response to a difference between an amplitude of the first signal and the saturation limit.

In a preferred implementation, a multiplier comprises first data from a sensor sensing an operating condition of the engine (e.g., an ion sensor, a fuel quality sensor, a contaminant sensor, an EGR sensor, an A/F sensor, and the like) and second data selected from a map describing the operating condition (e.g., a parameter selected from a table of parameters, each parameter associated with a particular combination of speed and load).

An exemplary system may comprise a processor (e.g., in an engine control unit or an ignition control unit) and configured to control the operation of an engine, and configured to calculate a first signal from an ion current measured by an ion sensor; b. an ion sensor in communication with the processor, the ion sensor configured to sense an ion current in a cylinder of the engine during a combustion event and transmit the ion current to the processor; c. a computer readable non-transitory storage medium coupled to a memory and the processor, the storage medium having embodied thereon instructions executable by the processor to perform one or more methods described herein.

A system may comprise a processor configured to receive a first signal from an ion sensor configured to measure ion current during a combustion event in a cylinder of the engine, and calculate a knock index from the first signal. The processor may determine an expected knock intensity for the combustion event; determine an operating condition of the engine during the combustion event, and at least one of:
  combine the knock index with one or more multipliers to determine a knock proxy, the multipliers based on the operating condition, the knock proxy representing a knock index that has been normalized to the operating condition; and
  combine the expected knock intensity with one or more multipliers to determine a knock intensity proxy, the multipliers based on the operating condition, the knock intensity proxy representing an expected knock intensity that has been normalized to the operating condition. The system may be configured to compare at least one of:
  a. the calculated knock proxy to the expected knock intensity; and
  b. the knock index to the knock intensity proxy,
to determine a deviation; and correct the operation of the engine, preferably adjust at least one of an ignition timing and a fuel injection, when the deviation exceeds a threshold that indicates correction is required.

A system may comprise a sensor configured to sense the operating condition of the engine, which may include the ion sensor configured to sense the ion current. A system may comprise an ion sensor and another sensor configured to sense operating condition, and in some cases, a multiplier is calculated based on both sensors. The sensor may comprise a fuel quality sensor, a contaminant sensor, an A/F sensor, an EGR sensor, a temperature sensor, and the like.

The system may comprise an amplifier and gain control feedback circuit. The circuit may incorporate operating condition data and/or ion current data to determine a gain of the amplifier. In some cases, amplifier gain is adjusted according to the engine operating condition. In some cases, a value of the first signal is compared to a saturation limit of the amplifier, and the gain is adjusted in response (e.g., increased if the signal is too low or decreased if the signal saturates the amplifier). The gain may be adjusted in response to a map (e.g., an engine map, such as an engine map comprising speed and load). Various systems may be configured to perform disclosed methods.

Thanks to the method according to the invention, a plurality of factors relating to the operation of the engine, such as the fuel quality, EGR, ignition timing, air/fuel ratio (A/F), are taken into account when determining the cylinder pressure, thereby arriving at a more reliable and accurate value for said cylinder pressure than would be the case if the calculations were based solely on load and speed (rpm) of the engine.

According to an aspect of the invention, the engine index determined through the method is calculated for a number of cycles, preferably at least 4, and a mean (or average) "comprehensive" engine index is calculated. The offset determined may be more stable and accurate with such averaging.

According to another aspect of the invention, the first signal based on an ion current of the cylinder is kept at a desired level by determining a peak amplitude of the signal and using gain control.

According to yet another aspect of the invention, the peak position of the first signal can be determined, giving information regarding the fuel quality and allowing for an offset to increase the fuel efficiency and further optimise cylinder pressure and eliminate knocking.

More aspects and advantages of the invention will also become readily apparent to the person skilled in the art in view of the appended detailed description below.

BRIEF DESCRIPTION OF THE DRAWINGS

The present invention will now be described in more detail with reference to the appended drawings, wherein.

DETAILED DESCRIPTION OF THE INVENTION

Various systems (e.g., controllers and the like) comprise a computer-readable non-transitory storage medium coupled to a processor and a memory. Executable instructions stored in the medium and/or memory may be executed by the processor to perform one or more methods. A processor may be incorporated into an ignition control unit, an engine control unit, and/or be a discrete component. Examples described herein are merely illustrative, and not intended to be limiting.

Figure 1:
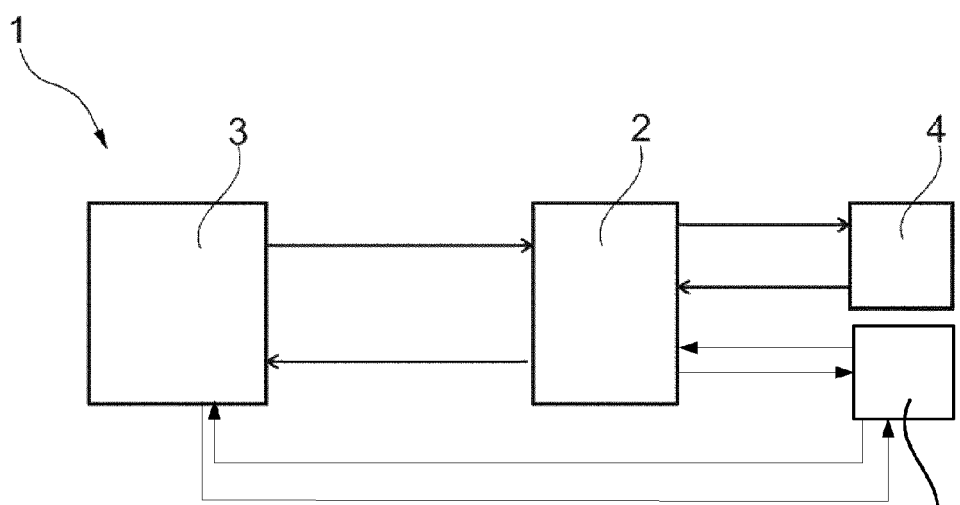
FIG. 1 shows a schematic view of a preferred embodiment of the system of the present invention.

FIG. 1 discloses a control system 1 for controlling the operation of an engine, having an ignition controller 2 that serves to control at least one spark plug unit 4 to generate a spark in a cylinder of the engine, according to some embodiments. A processor (e.g., in ignition controller 2) receives information from the spark plug unit in the form of a first signal corresponding to an ion current and uses this signal to determine a knock index as will be described in more detail further below. The knock index may represent a measured intensity of a knocking event during the measured combustion event. For example, a knock intensity may range from "minimal" to "low" to "moderate" to "high" to "damaging."

As knocking is a pressure-event within the cylinder, the knock index is used as input to an electronic engine control unit (ECU) 3 where an operating condition (e.g., an engine index) relating to a cylinder pressure of the cylinder is determined, as will also be described in more detail below. Said operating condition/engine index is used to determine an offset or correction suitable to further optimise the operation of the engine. This offset/correction is fed back (e.g., to the ignition controller 2) which gives a feedback input to the spark plug unit 4 to alter the ignition timing according to the feedback input. The ignition controller 2 and ECU 3 can be different components performing the tasks as described herein, but can also be a single unit or a plurality of units communicating with each other to arrive at the correction required to optimise the operation of the engine.

In some cases, a sensor 5 is used to sense an operating condition of the engine. Sensor 5 may include an ion sensor, which may be incorporated into spark plug unit 4. Sensor 5 may comprise a fuel quality sensor, a humidity sensor, a contaminant sensor, an air quality sensor, an EGR sensor, an A/F sensor, and/or any other sensor configured to sense an operating condition of the engine.

Figure 2:
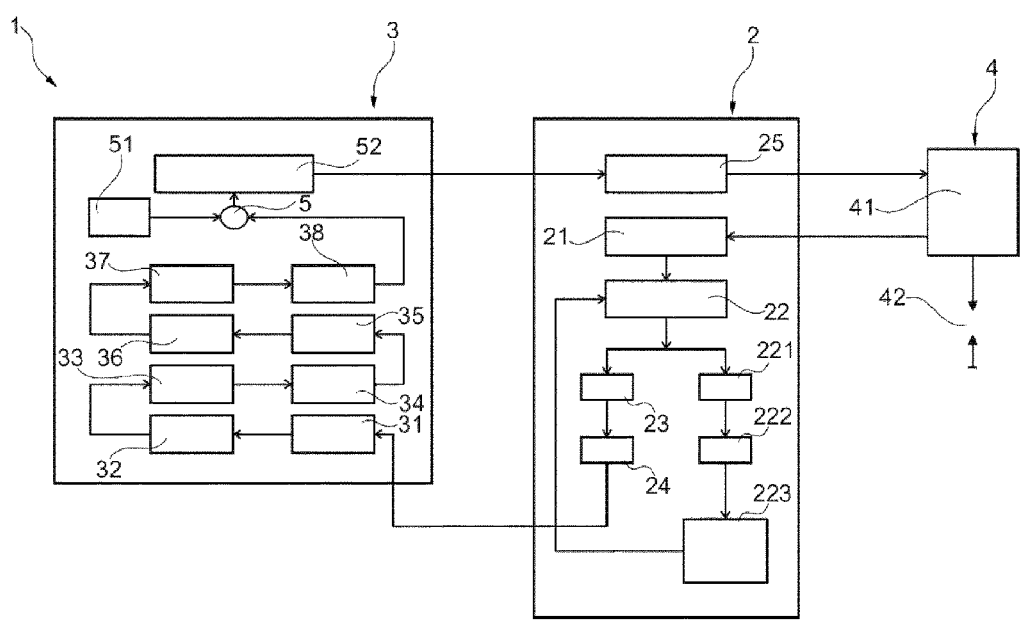
FIG. 2 shows an more detailed schematic view of the system of FIG. 1.

FIG. 2 discloses the control system 1 in more detail, with the ignition controller 2 that serves to control at least one spark plug unit 4 comprising a coil 41 to generate a spark at a spark plug 42. A processor (e.g., in said ignition controller 2) is configured to detect an ion current in a cylinder of the engine in the form of a first signal and to analyse said first signal to determine a knock index that describes an intensity of a knocking event in the cylinder, which may describe the operation of the engine and of the cylinder in particular at a given combustion time, and according to a particular operating condition.

The knock index is then analysed (e.g., by the electronic control unit (ECU) 3) and is combined with a series of multipliers (e.g., multiplied by one or more multipliers) associated with the operating condition at a given time (e.g., combustion event) for the engine. A multiplier may be selected from a table (e.g., a map, such as an engine map comprising speed, load, and a value for one or more multipliers at each combination of speed and load). A multiplier may be calculated from a sensor configured to sense the operating condition. In some cases, a multiplier comprises a first parameter selected from a table (comprising the operating condition) and a second parameter calculated from data provided by a sensor (sensing the operating condition). The sensor may be a different sensor than the ion sensor. The sensor may be the same sensor as the ion sensor. The operating condition may be used to determine an expected knock intensity for that combustion cycle. The expected knock intensity may be a plurality of values (e.g., low, medium, high) representing an "acceptable" or "expected" intensity of the knocking event. For example, an expected knock intensity at low load might be "low intensity," while an expected knock intensity at high load might be "high intensity."

The operating condition (as represented by the one or more multipliers) may be used to "scale" or "normalize" a value, to improve the accuracy with which a measured value is compared to an expected value (e.g., to determine an engine index that discloses the cylinder pressure at said time). The multipliers may be used to "normalize" or otherwise scale values according to the operating condition. In some cases, the knock index (based on the first signal) is scaled according to the multiplier. For example, an operating condition associated with a high expected knock intensity may have a large multiplier, whereas an operating condition associated with a low knock intensity may have a small multiplier. Multiplying the calculated knock index by the respective multiplier may "scale" the knock index to a value that is a proxy for the operating condition. A knock index that is modified by the multiplier may be described as a knock proxy. The knock proxy may be compared to an expected knock intensity (e.g., for that operating condition) to determine if a correction is required.

In some embodiments, a knock intensity proxy may be calculated. The knock intensity proxy may comprise an expected knock intensity modified by (e.g., divided by) one or more multipliers representing the operating condition. The knock intensity proxy may be compared to the knock index. If the knock index exceeds the knock intensity proxy (e.g., knocking is too intense) the engine may be adjusted (e.g., detuned). If the knock index is far below the knock intensity proxy (suggesting knocking could be increased without harm) performance may be increased (e.g., the engine may be "tuned up").

In some cases, by using sensitivity data relating to the engine itself, it can be determined whether the operation of the cylinder needs to be adjusted and, if so, how.

The control system 1 will now be described in more detail. The signal relating to the ion current of the cylinder will be designated as the first signal throughout the text, and similarly the signal relating to the knock index and given as input to the processor will be designated as the second signal, even though said signals may in some cases have been altered by filtering or other analysis or have been combined with a series of multipliers.

As previously stated, the control system 1 comprises an ignition controller 2, an ECU 3 and a spark plug unit 4. It is to be noted, however, that the control system 1 can preferably comprise multiple spark plug units 4 and possibly multiple ignition controllers 2 so that the operation of every cylinder in the engine can be controlled by the system and method according to the present invention. In some embodiments, comparisons are made based on an average value over a plurality of cylinders and/or over a period of time (e.g., a plurality of combustion events).

An ion current is detected in the form of a first signal by an ion current detector 21, preferably in the form of a first sensor 21 of the ignition controller 2. In order to facilitate the subsequent analysis, the first signal may be subjected to gain control by gain controller 22, using a feedback loop where the first signal passes a first filter 221 to low pass filter the first signal, a peak detector 222 and constant level controller 223 to reduce noise, detect a peak of the first signal and determine a gain level that is suitable to keep the amplitude of the first signal at a predetermined level. A method may comprise determining an amplitude of at least a portion of the first signal and adjusting the gain applied according to the amplitude. For example, if the first signal saturates the amplifier, the gain may be reduced. If the amplitude of the first signal is too low, the gain may be increased. Preferably, gain control is adjusted such that the portion of the first signal used to determine knock index (e.g., a window in the time or frequency domain) has an amplitude that is between 20 and 50%, including between 25 and 40%, including about 33% of full scale, Thereby, the following analyses are simplified and the knock index determined can be more easily combined with multipliers describing the conditions of the engine, as will be described more in detail below.

By thus adjusting the gain controller 22, the amplitude of the first signal can be kept at a suitable level. The first signal then passes a second filter 23 where it is suitably filtered to allow for a determination of the knock index by knock index calculator 24. The filtering performed may be a band pass filtering that preserves only frequencies of a desired interval, suitably about 3-14 kHz, but can also be performed in the time dimension so that only an interval corresponding to a part of the revolution of the crank shaft is preserved, preferably from the top dead centre position (TDC) to about 40°-50° after the TDC, or from TDC until the signal has reached a magnitude below a predetermined level, such as 1% of the peak value, for instance, and can thus be said to have died out. The knock index is then determined using a suitable method as is well known in the art, and a second signal corresponding to said knock index is transmitted to the ECU 3 for further analysis.

The second signal (e.g., corresponding to the knock index) may be transformed into an engine index, a knock proxy, and/or a knock intensity proxy in an engine index converter 31 by multiplying with a first multiplier from a map (e.g., corresponding to the current speed (rpm) and load of the engine). The first multiplier may be selected from the map (according to the speed and load at that combustion cycle) and used as a multiplier on the second signal corresponding to the knock index. The first multiplier may be calculated from input from a sensor (e.g., sensor 5, FIG. 1).

The resulting engine index, knock proxy, and/or knock intensity proxy calculated by the engine index converter 31 generally gives an indication of the cylinder pressure during the cycle when the first signal (corresponding to the ion current of said cylinder) was generated. This indication may be used to determine whether the operation of the engine, in particular the cylinder and the spark given to ignite the fuel, should be in any way corrected to improve the operating conditions of the engine.

In some embodiments, to arrive at a more comprehensive engine index, a series of compensations are made, multiplying the engine index/knock proxy/knock intensity proxy of the second signal with a series of multipliers corresponding to different operating modes of the engine. For example, a second multiplier 32 may correspond to the timing of the ignition, i.e. the position of the crank shaft at the moment of ignition. A third multiplier 33 may correspond to deviations in the air/fuel ratio (i.e. lambda), a fourth multiplier 34 may correspond to deviations in the EGR (i.e. exhaust recirculation), and a fifth multiplier 35 may correspond to deviations in fuel quality. The resulting comprehensive engine index (CEI) is stored by an averaging storage system 36. An average engine index and/or average CEI (or average knock proxy or average knock intensity proxy, as the case may be) over a number of cycles may be calculated, preferably over 2-100, including 4-80, including 10-50 cycles.

The average value may be compared (e.g., with a knock sensitivity 37, which may represent an expected knock intensity) to determine whether a correction is needed to the operation of the engine, and if so, the alteration required is determined in an offset determinator 38. In a standard operation of the engine, the offset determinator 38 indicates an adjustment of the ignition timing of one or more cylinders to eliminate knocking. In some cases, the desired offset may also be to alter the fuel mixture in one or more of the cylinders to act as a cooling agent to the cylinder in cases where an adjustment of the ignition timing cannot in itself eliminate knocking.

The offset determinator 38 is combined with ignition data from an ignition map 51 in a summation device 5 to arrive at the desired alteration in ignition timing 52. This alteration is given as output from the ECU 3 and input to the ignition controller 2, where a coil driver 25 drives the coil/coils of the spark plug unit 4. Thus, the offset determined by the control system 1 is given as feedback to the spark plug unit 4 to control the ignition timing. If an offset regarding the fuel mixture is also used, this is also given as output from the ECU 3 to suitable components of the engine (not shown).

When analysing the ion current (e.g., in the ignition controller 2), the position and amplitude of the peak of the first signal can also yield information regarding the combustion speed in the cylinder, indicating the need for corrections to optimise fuel efficiency and further affect the cylinder pressure. By thus analysing the signal to determine differences in comparison with the ignition map (e.g., a representation of expected values for these parameters at an operating condition) indicating the normal operation of the ignition, it can be determined whether a further correction of the fuel mixture is desired or whether the ignition timing should be further adjusted to allow for an optimised operation of the engine. This analysis may take place in the ignition controller 2 or the ECU 3 or both, and the results of the analysis be taken into account when determining the offset based also on the engine index indicating the cylinder pressure, as also described above.

The invention is not to be seen as limited by the preferred embodiment described above, but can be varied within the scope of the appended claims, as will become readily apparent to the person skilled in the art. For instance, the analyses described can be performed by different components and sometimes in a different order.

The invention claimed is:

1. A method for controlling the performance of an engine, comprising:
 a1) detecting a first signal representing an ion current from an ion sensor sensing a combustion event in a cylinder of the engine and passing the first signal through an amplifier having an adjustable gain;
 a2) transforming the amplified first signal into a frequency domain as a low pass filtered amplified first signal and a high pass filtered amplified first signal;
 a3) low pass-filtering the amplified first signal into a low pass signal, comparing the low pass signal to a saturation limit of the amplifier, and adjusting a gain of the amplifier in response to a difference between the low pass signal and the saturation limit;
 b) high pass filtering of the amplified first signal and determining a knock index representing a knock intensity ranging from a pre-determined minimal knock intensity to a pre-determined damaging knock intensity based on the amplified first signal;
 c) determining an operating condition of the engine during the combustion event from at least one of a sensor sensing the operating condition and a map describing the operating condition comprising a speed of the engine and a load on the engine during the combustion event;
 d) identifying an expected knock intensity defined as a pre-determined level of non-damaging intensity of a knocking event during the combustion event;
 e) using one or more multipliers based on the operating condition, wherein a multiplier is at least one of:
  a. calculated from data provided by the sensor sensing the operating condition comprising at least one of the ion sensor, a fuel quality sensor, a temperature sensor, and a contaminant sensor, and
  b. a value from a pre-defined table comprising an engine map of speed and load;
 f) calculating at least one of:
  a. knock proxy based on the knock index and the one or more multipliers, wherein the knock index is multiplied by at least one of the multipliers; and
  b. a knock intensity proxy based on the expected knock intensity and the one or more multipliers, wherein at least one expected knock intensity is divided by at least one of the multipliers;
 g) comparing at least one of:
  a. the calculated knock proxy to the expected knock intensity; and
  b. the knock index to the knock intensity proxy,
 to determine a deviation; and
 h) correcting the operation of the engine to adjust at least one of an ignition timing and a fuel injection, when the deviation exceeds a pre-determined deviation threshold that indicates correction is required.

2. The method of claim 1, further comprising:
 a. repeating steps a)-f) for at least 2 combustion events up to at least 50 combustion events, prior to correcting the operation in step h), and
 b. comparing comprises comparing an average value of at least one of the knock index, the knock proxy and the knock intensity proxy over the repeated combustion events.

3. The method of claim 1, wherein determining the knock index comprises calculating at least one of:
 a. a peak amplitude of the first signal; and
 b. an integral of at least a portion of the first signal between a first time and a second time.

4. The method of claim 1, wherein determining the knock index comprises:
 a. transforming the first signal into the frequency domain;
 b. bandpass-filtering the first signal; and
 c. determining at least one of an amplitude of the bandpass-filtered transformed first signal and an integrated area of at least a portion of the bandpass-filtered transformed first signal.

5. The method of claim 1, wherein the one or more multipliers are one or more values from an engine map based on at least two of engine load, rpm, fuel quality, EGR, timing, and A/F.

6. The method of claim 4, wherein calculating the knock index comprises determining a peak position of at least one of the first signal and the transformed first signal.

7. The method of claim 1, wherein determining the knock index comprises transforming the first signal into a frequency domain and determining a peak position of a peak in the transformed first signal.

8. The method of claim 1, wherein determining the operating condition comprises using a first parameter from an engine map and measuring a second parameter from at least one sensor sensing the operating condition.

9. The method of claim 1, wherein the at least one sensor sensing the operating condition includes a fuel quality sensor, a sensor detecting a contaminant in a fuel, a temperature sensor, a humidity sensor, an EGR sensor, and A/F sensor, and a pressure sensor.

10. The method of claim 1, wherein the at least one sensor sensing the operating condition comprises the ion sensor sensing the combustion event.

11. The method of claim 1, wherein a first multiplier is a value from a table comprising the operating condition, and a second multiplier is calculated from data provided by the sensor sensing the operating condition.

12. The method of claim 11, further comprising adjusting a gain of an amplifier configured to amplify the first signal, wherein adjusting comprises scaling the gain by the first and second multipliers.

13. A system comprising:
   a. an engine control unit (ECU) comprising a processor and configured to control the operation of an engine, the ECU configured to calculate a first signal from an ion current measured by an ion sensor;
   b. an ion sensor in communication with the engine control unit, the ion sensor configured to sense an ion current in a cylinder of the engine during a combustion event and transmit the ion current to the ECU;
   c. a computer readable non-transitory storage medium coupled to a memory and the processor, the storage medium having embodied thereon instructions executable by the processor to perform a method according to claim 1.

14. A system for controlling an operation of an engine, the system comprising:
   an ion sensor configured to sense a combustion event within a cylinder of the engine;
   a processor in communication with the ion sensor in at least one of an ignition control unit and an Engine Control Unit,
   a memory in communication with the processor and configured to store instructions executable by the processor, and
   a non-transitory storage medium in communication with the memory and processor, the medium having embodied thereon instructions executable by the processor said system comprising:
   a) an amplifier with variable gain connected to an ion sensor receiving a first signal representing an ion current from the ion sensor, said amplifier producing an amplified first signal, and said amplified first signal connected to a low pass filter in a feedback loop controlling the gain of the amplifier;
   b) said amplified first signal also connected to a high pass filter producing a knock index ranging from a pre-determined minimal knock intensity to a pre-determined damaging knock intensity based on the amplified first signal;
   c) determining an operating condition of the engine during the combustion event from at least one of a sensor sensing the operating condition and an engine map comprising a speed of the engine and a load on the engine during the combustion event;
   d) the processor identifying from the memory an expected knock intensity defined as a pre-determined level of non-damaging intensity of a knocking event during the combustion event;
   e) sending the knock index through one or more multipliers based on the operating condition and obtaining a knock proxy, wherein a multiplier contains a value representative of at least one of:
      a. a value obtained from the memory comprising at least one operating condition as detected by the ion sensor, a fuel quality sensor, a temperature sensor, or a contaminant sensor, and
      b. a value from a pre-defined table comprising an engine map of speed and load;
   f) calculating at least one of:
      c. knock proxy based on the knock index and the one or more multipliers, wherein the knock index is multiplied by at least one of the multipliers; and
      d. a knock intensity proxy based on the expected knock intensity and the one or more multipliers, wherein at least one expected knock intensity is divided by at least one of the multipliers;
   g) comparing at least one of:
      e. the calculated knock proxy to the expected knock intensity; and
      f. the knock index to the knock intensity proxy,
   to determine a deviation; and
   h) correcting the operation of the engine, comprising adjusting at least one of an ignition timing and a fuel injection, when the deviation exceeds a pre-determined deviation threshold that indicates correction is required.

15. The system of claim 14, further comprising a sensor configured to sense an operating condition of the engine.

16. The system of claim 15, further comprising an amplifier coupled to the ion sensor, the amplifier configured to amplify the first signal.

17. The system of claim 14, wherein the gain control circuit is configured to adjust the gain according to a speed and load of the engine.

18. The system of claim 13, wherein the processor is configured to perform a method according to claim 1.

* * * * *